Patented Sept. 9, 1952

2,610,161

UNITED STATES PATENT OFFICE 2,610,161

MODIFIED DRYING OILS

Orville L. Polly, Long Beach, Calif., assignor to Union Oil Company of California, Los Angeles, Calif., a corporation of California No Drawing. Application January 8, 1949, Serial No. 69,982

13 Claims. (Cl. 260—23.5)

This invention relates to modified drying oils consisting of a partially polymerized mixture of drying oils or drying oil fatty acids with styrene and allyl and methallyl esters of aliphatic dicarboxylic acids.

It is well known that drying oils such as China-wood oil, linseed oil, dehydrated castor oil and the like may be copolymerized with styrene to produce relatively low molecular weight liquid polymers which may be substituted for the drying oil alone in paint and varnish compositions. Such copolymerization products have advantages over drying oils alone in that drying rates of the resulting paints and varnishes can be closely controlled, depending upon the degree of copolymerization, the proportion of styrene employed and the type of drying oil used. Moreover, the resulting dried paint or varnish films are harder and yet retain, to a certain degree, the flexibility of paint and varnish produced with the ordinary drying oils. A still further advantage in the use of such modified drying oils is that the drying oils are extended by such treatment and thus the styrene is, in effect, substituted for part of the drying oil normally required in a paint or varnish composition.

One objection to the modified drying oils of the above type is that where the proportion of styrene is relatively high, the dried film resulting from normal drying in surface coatings loses its flexibility, i. e., is harder and more brittle than the film produced with the normal drying oils. Moreover, the copolymerization must be closely controlled to prevent the production of styrene polymers which are insoluble in the mass. Thus, along with copolymerization apparently in some instances and under some conditions homopolymerization occurs to such a degree that insoluble styrene polymer is produced.

It is an object of this invention to prepare a modified drying oil in which it is possible to incorporate large proportions of synthetic polymers, as for example, styrene, without obtaining drying oils which do give rise to brittleness in the paint and varnish films obtained when using the modified drying oil.

It is another object of the invention to provide a modified drying oil consisting of a copolymerized mixture of drying oil, styrene and a modifying agent, e. g., allyl succinate, which resulting modified drying oil may contain relatively high proportions of synthetic polymerizing agents and correspondingly low proportions of drying oil and still be a type of drying oil which does not give the brittle surface coverings resulting when the drying oil is modified by styrene alone.

It is still another object of the invention to provide a method of preparing a styrenated drying oil which is more easily controlled than the ordinary styrenation process to prevent the formation of insoluble polymers during the copolymerization step.

According to the invention a synthetic drying oil having particularly desirable film-forming characteristics is prepared by polymerizing a mixture of a drying oil, styrene and a modifying agent such as allyl succinate at temperatures in the range of about 250° F. to 600° F. for two hours to thirty hours or more depending on the temperature and the extent of polymerization desired. At this time the polymerized mass is still fluid, is completely homogeneous and is readily incorporated in paint and varnish compositions, i. e., is readily and completely soluble in ordinary paint and varnish thinners and does not impart undue viscosity to the resulting paints and varnishes. Moreover, it is found that the ordinary paint pigments are readily ground into the vehicle comprising the modified drying oil and thinner, or even the drying oil alone. Another feature of the synthetic drying oil of this invention is that because of the fact that large proportions of synthetic materials can be employed in its preparation, which materials give rise to substantially colorless polymers, the color of the resulting drying oil is generally appreciably lighter than the natural drying oil from which it is produced.

A further feature of the drying oil of this invention is that the films which it forms when used in paint or varnish compositions are apparently less susceptible to oxidative degeneration in the presence of sunlight and/or moisture than are the corresponding films produced from natural drying oils or styrenated drying oils which do not contain the modifying agent.

Another feature of the invention is that cheaper grades of drying oils, such as rape oil and soya oil, may be employed as the natural drying oil in the above conjoint polymerization operation. Apparently the resulting partially polymerized mass is capable of further polymerization and/or drying in films to produce non-tacky surface coatings, even though if the drying oils were used by themselves or even in the presence of large quantities of driers, as for example lead or cobalt naphthenate would produce films requiring many days or even weeks to produce non-tacky films on wood and metal surfaces.

It is a further feature of this invention that mixtures of drying oils such as linseed or China-wood oil with other fatty oils generally not considered to be drying oils may be polymerized with styrene and allyl succinate, for example, to produce synthetic drying oils having all of the characteristics required of drying oils. Such other fatty oils include fish oils, lard oil, cottonseed oil and the like.

In place of styrene, alpha-methyl styrene and other alkyl substituted styrenes where the alkyl substituent is in the ring may be employed. Alkyl substituents such as ethyl, methyl and propyl groups in the ring do not greatly modify the copolymerizing characteristics of styrene, at least for the purpose indicated herein, so that the various isomeric methyl, ethyl and propyl styrenes are suitable for use in place of styrene for the purpose of this invention.

By the term modifying agent as used herein it is meant to include the allyl and methallyl esters of succinic acid, glutaric acid and adipic acid. Thus, I may employ allyl succinate, methallyl succinate, allyl glutarate, methallyl glutarate, allyl adipate and methallyl adipate. These esters may be defined as the allyl and methallyl esters of saturated aliphatic dicarboxylic acids having more than 3 and less than about 7 carbon atoms in the acid molecule. This particular group of esters is selected since it is found that they co-operate with the styrene to produce by copolymerization with drying oils a modified drying oil having exceptional characteristics as disclosed herein. Apparently the lower molecular weight esters such as allyl oxylate and allyl malonate do not have the desired modifying action. The resulting drying oils are not as stable and do not produce drying films which have the clarity, toughness and non-brittle characteristics, at least to the same degree as do the esters particularly described. Moreover, the esters having more than 7 carbon atoms in the acid portion of the molecule do not appear to have the same modifying effect as the selected esters. The terms "allyl esters" and "methallyl esters" are synonymous with the terms "diallyl esters" and "dimethallyl esters" and are used herein in this sense. Thus, for example, by the term "allyl succinate" is meant the diallyl ester of succinic acid.

In preparing a modified styrenated drying oil of this invention a drying oil such as linseed oil is heated to a temperature of about 250° F to 450° F., generally about 300° F. to 400° F. and to the heated drying oil is added a mixture of styrene or methyl styrene and a modifying agent such as allyl succinate. The addition is preferably made gradually, i. e. over a period of two to ten hours, although where the proportion of modifying agent is relatively high it is found that the styrene and modifying agent may be added initially and the total mixture heated to polymerizing temperatures without the formation of insoluble polymers. The total heating time is generally between ten and twenty-five hours. However, shorter periods as, for example, five hours, and longer periods such as thirty to forty hours may be desirable in some cases. Usually during the last one to four or five hours of heating the temperature is raised to about 450° F to 600° F. The product is clear and generally lighter in color than the drying oil employed.

Although the above reaction may be carried out without the use of catalytic agents it is generally desirable to employ polymerization catalysts such as any of those well known for aiding the polymerization of vinyl type compounds. Particularly effective catalysts include the organic peroxides such as benzoyl peroxide, acetyl peroxide, lauroyl peroxide and the like; metal peroxides such as lead peroxide and hydrogen peroxide. Other catalysts include the perborates, as for example, the alkali metal perborates and persulfates, as for example, the alkali metal persulfates. The amount of catalyst to be employed will generally be between about 0.1% and 3% of the polymerization charge.

The ratio of drying oil to styrene and modifying agent may be varied over wide limits. Thus, desirable modified styrenated drying oils are prepared according to this invention using amounts of drying oil between 20% and 80% by weight of the polymerization charge. Correspondingly, amounts of styrene and modifying agent will vary between 80% and 20% by weight. Preferably, between about 30% and 65% by weight of drying oil will be employed with between 70% and 35% by weight of the mixture of styrene and modifying agent.

The ratio of styrene to modifying agent may also vary over rather wide limits. However, on the basis of the mixture of styrene and modifying agent, styrene will constitute between about 40% and 95% and the modifying agent correspondingly between about 60% and 5%. Preferably, styrene will constitute between 45% and 85% of this mixture and, correspondingly, the modifying agent will constitute between 55% and 15%.

Although it has been indicated that a mixture of styrene and modifying agent is added to a drying oil and the mixture polymerized to produce high quality modified styrenated drying oils, it is found that satisfactory drying oils having the characteristics set forth herein may be prepared by heating the drying oil to be styrenated to a temperature in the range of about 250° F. to 400° F. and adding the styrene slowly over a period of several hours, such as about six hours, and subsequently adding the modifying agent to the heated, partially copolymerized mass. Polymerization is then continued until the desired amount of polymerization has taken place, i. e. continued for an additional twelve hours, for example. It will be obvious that the temperatures at which polymerization occurs may be well above the normal boiling point of styrene and of the polymerization modifier. In such cases it is necessary that the polymerization be effected under pressure sufficient to prevent excessive volatilization, at least during the early stages of the polymerization. The use of pressure may be obviated, to a certain degree at least, by the use of total reflux condensers. In either case when the desired amount of polymerization has occurred pressure is released or reflux is diverted in order to remove unpolymerized styrene and/or modifying agent from the mass if such is present. Generally, however, it is found that in the presence of the modifying agents indicated herein it is seldom necessary to remove low molecular weight materials and unpolymerized materials from the finished drying oil. Apparently little or no monomeric styrene or modifying agent is present in the product.

In addition to the natural drying oils referred to herein it is within the scope of this invention to styrenate, using the modified procedures of this invention, synthetic drying oils which may be prepared by reacting unsaturated fatty acids having 10 to 20 or more carbon atoms per molecule with glycerol or pentaerythritol to produce the corresponding esters. Where these fatty acids contain two unsaturated groups per molecule, preferably in conjugated positions, such oils have the ability to dry and may be substituted in the above disclosure for the mentioned natural drying oils.

Other synthetic drying oils which may be successfully employed in the process of this invention include those which are produced by dehydroxylating glycerol or pentaerythritol esters of alpha-hydroxy acids obtained by oxidizing paraffin wax and like hydrocarbon mixtures.

Synthetic drying oil may be prepared by oxidizing paraffin wax having a melting point of 145° F. to 155° F. at a temperature of about 265° F. and a pressure of 75 to 80 pounds per square inch gage. Air is bubbled through the liquid wax until the acid number of the product is about 250 mg. KOH per gram. This requires around 125 to 130 hours. The product from this oxidation is water washed to extract water-soluble materials and the water-insoluble portion is mixed with about one and one-half parts of a 9% by weight aqueous solution of sodium borate. The resulting mixture is then extracted with a light hydrocarbon fraction as, for example, a light gasoline, at a temperature of about 160° F. using three washes, each having a volume approximately equal to the volume of material to be extracted. The resulting aqueous phase, after separation of the extract, is heated to 200° F. to volatilize light hydrocarbon and then acidified with concentrated sulfuric acid. An oily fraction separates which consists of alpha-hydroxy acids and estolides of alpha-hydroxy acids. This fraction is water washed to remove sulfuric acid and inorganic salts. The alpha-hydroxy acid-estolide fraction is mixed with about 0.5 part of xylenes and 0.15 part by weight of glycerol and the mixture refluxed for twelve hours at a temperature of approximately 320° F. To this mixture is added about 3% by weight of benzene sulfonic acid as a dehydroxylation catalyst and refluxing continued using a water trap in the reflux line to effect dehydroxylation of the ester. The resulting product after refluxing for an additional six hours is a synthetic drying oil having desirable characteristics and one which lends itself to the modified styrenation treatment of this invention. In place of the glycerol ester pentaerythritol esters, which are prepared in similar manner, may be substituted and the resulting dehydroxylated esters are also satisfactory drying oils for use in the process of this invention. Furthermore, although it was indicated that a mixed alpha-hydroxy acid-estolide fraction was employed, it was equally feasible to employ the alpha-hydroxy acids alone or the corresponding estolides alone in the above indicated preparations. The above example is merely indicative of methods of preparing synthetic drying oils and regardless of how such synthetic drying oils are prepared they may be employed in the process of the present invention.

The following examples of the invention illustrate the principles thereof:

*Example I*

Forty parts by weight of raw linseed oil is heated to 310° F. for six hours and to the heated oil is added 60 parts by weight of a mixture of 50 parts styrene and 10 parts allyl succinate over a three-hour period. Heating at 310° F. to 320° F. is continued for an additional eight hours, at which time the temperature is raised to about 550° F. for three and one-half hours. On cooling the product is a clear semi-viscous liquid soluble in paint and varnish thinners. A sample of the product dissolved in 3 parts of mineral thinner and spread on a metal surface dries to give a non-brittle, tough, transparent film.

*Example II*

Example I is repeated except that alpha-methyl styrene is substituted for the styrene. The product is substantially the same as the product of Example I.

*Example III*

Example I is repeated except that 1.5% by weight of benzoyl peroxide based on the total reaction mixture is added along with the styrene and allyl succinate. The time of heating at 310° F. to 320° F. following the addition of styrene is reduced from eight hours to five hours. The product of this reaction is similar to the product obtained in Example I.

*Example IV*

Thirty parts by weight of dehydrated castor oil is heated to 320° F. and 70 parts by weight of a mixture of 50 parts of styrene, 19 parts of methallyl succinate and one part of benzoyl peroxide is added to the heated oil over a six-hour period. The temperature is then raised to 380° F. where it is maintained for about five hours and then raised to 500° F. for two hours. The product on cooling is a clear amber-colored liquid having excellent film-forming characteristics.

Allyl glutarate may be substituted in the above preparation for the methallyl succinate and the resulting modified drying oil has characteristics similar to that obtained with the methallyl succinate. Moreover, allyl adipate may be substituted for the methallyl succinate in the above preparation to produce a modified drying oil of similar characteristics.

All of these drying oils have excellent film-forming characteristics.

*Example V*

Forty-five parts by weight of raw linseed oil and 55 parts by weight of a mixture of equal parts of styrene and allyl succinate containing 0.5% by weight of benzoyl peroxide are heated for a period of fifteen hours at 340° F. and the temperature is then raised to 550° F. for three hours. The product on cooling is a clear liquid showing no tendency to separate insoluble polymers. It is readily soluble in paint and varnish thinners and has excellent film-forming characteristics.

*Example VI*

Thirty parts by weight of raw linseed oil and 10 parts by weight of cottenseed oil is heated to 350° F. for four hours. To the heated mixture is added 60 parts by weight of a mixture of 35 parts of styrene, 23.5 parts of allyl succinate and 1.5 parts of benzoyl peroxide over a period of four hours. The heating is continued for an additional six hours and then the temperature is raised to 525° F. for four hours and the product cooled. The resulting modified drying oil exhibits the desirable characteristics of the products of this invention.

*Example VII*

Fifty parts by weight of a synthetic drying oil prepared by oxidizing paraffin wax, separating an alpha-hydroxy acid-estolide fraction, esterifying this fraction with glycerol, and dehydrating the glycerol ester, according to the method described hereinabove, is mixed with 50 parts by weight of a mixture of 30 parts of styrene, 18.5 parts of allyl succinate and 1.5 parts of lauroyl peroxide. The resulting mixture is heated to 380° F. for ten hours, the temperature is then raised to 450° F. for an additional three hours and the product cooled. The resulting oil is found to be soluble in paint and varnish thinners and to have excellent film-forming characteristics.

The synthetic drying oils described herein, consisting of dehydroxylated glycerol or pentaerythritol esters of alpha hydroxy acids or estolides or mixtures thereof are claimed in copending application Serial No. 21,846, filed April 19, 1948, by Orville L. Polly and Orin D. Cunningham.

The foregoing description and examples of the invention are merely illustrative of the principles of the invention and are not to be taken as limiting the invention as variations may be made without departing from the spirit or scope of the following claims.

I claim:

1. A modified drying oil prepared by copolymerizing between 20% and 80% by weight of a drying oil selected from the class consisting of raw drying oils, dehydrated castor oils, synthetic drying oils consisting of the dehydroxylated glycerol and pentaerythritol esters of alpha hydroxy acids and estolides and mixtures thereof derived from oxidized paraffin wax, and synthetic drying oils consisting of glycerol and pentaerythritol esters of unsaturated fatty acids having 10 to 20 carbon atoms and containing at least 2 unsaturated groups per molecule and 20% to 80% by weight of a mixture containing between 40% and 95% by weight of a compound selected from the class consisting of styrene, alpha methyl styrene and the methyl, ethyl and propyl ring substituted styrenes and 60% to 5% by weight of an ester selected from the group consisting of the diallyl and dimethallyl esters of saturated aliphatic dicarboxylic acids having more than 3 and less than about 7 carbon atoms in the acid molecule, said copolymerization being effected at a temperature between about 250° F. and 600° F.

2. A modified drying oil according to claim 1 in which said ester is diallyl succinate.

3. A modified drying oil as in claim 1 in which said ester is dimethallyl succinate.

4. A method of preparing a modified styrenated drying oil which comprises copolymerizing between 20% and 80% by weight of a drying oil selected from the class consisting of raw drying oils, dehydrated castor oils, synthetic drying oils consisting of the dehydroxylated glycerol and pentaerythritol esters of alpha hydroxy acids and estolides and mixtures thereof derived from oxidized paraffin wax, and synthetic drying oils consisting of glycerol and pentaerythritol esters of unsaturated fatty acids having 10 to 20 carbon atoms and containing at least 2 unsaturated groups per molecule with between 80% and 20% by weight of a mixture containing between 40% and 95% by weight of a compound selected from the class consisting of styrene, alpha methyl styrene and the methyl, ethyl and propyl ring substituted styrenes and 60% to 5% by weight of an ester selected from the group consisting of the diallyl and dimethallyl esters of saturated aliphatic dicarboxylic acids having more than 3 and less than about 7 carbon atoms in the acid molecule, said copolymerization being effected at a temperature within the range of about 250° F. to 600° F.

5. The process which comprises polymerizing a mixture containing 20% to 80% by weight of raw drying oil and between 80% and 20% of a mixture of between 40% and 95% by weight of styrene and between 60% and 5% by weight of an ester selected from the group consisting of the diallyl and dimethallyl esters of saturated aliphatic dicarboxylic acids having more than 3 and less than about 7 carbon atoms in the acid molecule at a temperature within the range of about 250° F. to 600° F. to produce a fluid product.

6. The process which comprises polymerizing a mixture containing 30% to 65% by weight of a raw drying oil and between 70% and 35% by weight of a mixture of between 45% and 85% by weight of styrene and between 55% and 15% by weight of an ester selected from the group consisting of the diallyl and dimethallyl esters of saturated aliphatic dicarboxylic acids having more than 3 and less than about 7 carbon atoms in the acid molecule at a temperature within the range of about 250° F. to 450° F. and finishing the polymerization at a temperature in the range of about 450° F. to 600° F. to produce a fluid polymerized mixture having drying characteristics.

7. The process which comprises heating between 20 and 80 parts by weight of a raw drying oil to a temperature of 250° F. to 400° F. and adding thereto over a period of two to ten hours between 80 and 20 parts by weight of a mixture containing between 40% and 95% by weight of a compound selected from the class consisting of styrene, alpha methyl styrene and the methyl, ethyl and propyl ring substituted styrenes and between 60% and 5% by weight of an ester selected from the group consisting of the diallyl and dimethallyl esters of saturated aliphatic dicarboxylic acids having more than 3 and less than about 7 carbon atoms in the acid molecule and a polymerization catalyst, and continuing the heating for a time sufficient to effect copolymerization to produce a fluid polymerized product.

8. The process according to claim 7 in which said compound is alpha-methyl styrene and said ester is diallyl succinate.

9. The process which comprises heating between 20 and 80 parts by weight of a raw drying oil to a temperature within the range of 250° F. to 400° F., adding styrene slowly thereto and subsequently adding an ester selected from the group consisting of the diallyl and dimethallyl esters of saturated aliphatic dicarboxylic acids having more than 3 and less than about 7 carbon atoms in the acid molecule, continuing the heating for a time sufficient to effect copolymerization of the mass to produce a fluid polymer having drying characteristics, the total amount of styrene and ester added being between 80 and 20 parts by weight of which styrene constitutes between 40% and 95% by weight and said ester constitutes between about 60% and 5% by weight.

10. The process which comprises heating between 20 and 80 parts by weight of a synthetic drying oil to a temperature of 250° F. to 400° F. and adding slowly thereto between 80 and 20 parts by weight of a mixture of between 40% and 95% by weight of a compound selected from the class consisting of styrene, alpha methyl styrene and the methyl, ethyl and propyl ring substituted styrenes and between 60% and 5% by weight of an ester selected from the group consisting of the diallyl and dimethallyl esters of saturated aliphatic dicarboxylic acids having more than 3 and less than about 7 carbon atoms in the acid molecule and a polymerization catalyst and continuing the heating at a temperature between 250° F. and 600° F. to produce a fluid polymerized product, said synthetic drying oil being a dehydroxylated glycerol ester of a mixture comprising alpha-hydroxy acids derived from oxidized paraffin wax.

11. The process which comprises heating between 20 and 80 parts by weight of a synthetic drying oil to a temperature of 250° F. to 400° F. and adding slowly thereto between 80 and 20 parts by weight of a mixture of 40% to 95% by weight of styrene and between 60% and 5% by weight of an ester selected from the group consisting of the diallyl and dimethallyl esters of saturated aliphatic dicarboxylic acids having more than 3 and less than about 7 carbon atoms in the acid molecule and a polymerization catalyst and continuing the heaing at a temperature between 250° F. and 600° F. to produce a fluid polymerized product, said synthetic drying oil being a dehydroxylated glycerol ester of a mixture comprising estolides derived from oxidized paraffin wax.

12. The process which comprises heating 100 parts by weight of a mixture of between 20 and 80 parts by weight of a synthetic drying oil to a temperature of 250° F. to 400° F. and adding slowly thereto 80 to 20 parts by weight of a mixture of 45% to 85% by weight of a compound selected from the class consisting of styrene, alpha-methyl styrene, and the methyl, ethyl and propyl ring substituted styrenes and correspondingly between 55% and 15% by weight of an ester selected from the group consisting of the diallyl and dimethallyl esters of saturated aliphatic dicarboxylic acids having more than 3 and less than 7 carbon atoms in the acid molecule together with a polymerization catalyst and continuiing the heating at a temperature between 250° F. and 600° F. to produce a fluid polymerized product, said synthetic drying oil being a dehydroxylated pentaerythritol ester of a mixture comprising alpha-hydroxy acids derived from oxidized paraffin wax.

13. The process which comprises heating 100 parts by weight of a mixture of between 20 and 80 parts by weight of a synthetic drying oil to a temperature of 250° F. to 400° F. and adding slowly thereto 80 to 20 parts by weight of a mixture of 45% to 85% by weight of a compound selected from the class consisting of styrene, alpha-methyl styrene and the methyl, ethyl and propyl ring substituted styrenes and correspondingly between 55% and 15% by weight of an ester selected from the group consisting of the diallyl and dimethallyl esters of saturated aliphatic dicarboxylic acids having more than 3 and less than 7 carbon atoms in the acid molecule together with a polymerization catalyst and continuing the heating at a temperature between 250° F. and 600° F. to produce a fluid polymerized product, said synthetic drying oil being a dehydroxylated pentaerythritol ester of a mixture comprising estolides derived from oxidized paraffin wax.

ORVILLE L. POLLY.

REFERENCES CITED

The following references are of record in the file of this patent:

UNITED STATES PATENTS

| Number | Name | Date |
| --- | --- | --- |
| 2,202,846 | Garvey et al. | June 4, 1940 |
| 2,343,483 | Sorenson | Mar. 7, 1944 |
| 2,394,742 | Bent | Feb. 12, 1946 |
| 2,433,992 | Hughes | Jan. 6, 1948 |
| 2,453,666 | Kropa | Nov. 9, 1948 |

FOREIGN PATENTS

| Number | Country | Date |
| --- | --- | --- |
| 573,835 | Great Britain | Dec. 7, 1945 |

OTHER REFERENCES

Vincent: Industrial and Engineering Chemistry, vol. 29, No. 11, pp. 1267 to 1269, 1937.